United States Patent
Hodgins et al.

(10) Patent No.: US 9,156,159 B2
(45) Date of Patent: Oct. 13, 2015

(54) ROBOT CYCLIC LOCOMOTION USING A DYNAMIC OBJECT

(75) Inventors: Jessica Hodgins, Pittsburgh, PA (US); Katsu Yamane, Pittsburgh, PA (US); Yu Zheng, Pittsburgh, PA (US)

(73) Assignee: DISNEY ENTERPRISES INC., Burbank, CA (US)

( * ) Notice: Subject to any disclaimer, the term of this patent is extended or adjusted under 35 U.S.C. 154(b) by 569 days.

(21) Appl. No.: 13/415,605

(22) Filed: Mar. 8, 2012

(65) Prior Publication Data

US 2013/0238122 A1    Sep. 12, 2013

(51) Int. Cl.
| | |
|---|---|
| G06F 19/00 | (2011.01) |
| B25J 9/00 | (2006.01) |
| B62D 57/032 | (2006.01) |
| B62D 57/02 | (2006.01) |
| G05B 15/00 | (2006.01) |
| B25J 13/08 | (2006.01) |

(52) U.S. Cl.
CPC . *B25J 9/00* (2013.01); *B25J 13/085* (2013.01); *B25J 13/088* (2013.01); *B62D 57/02* (2013.01); *B62D 57/032* (2013.01); *G05B 15/00* (2013.01)

(58) Field of Classification Search
CPC .......... B25J 13/085; B25J 13/088; B25J 9/00; B62D 57/02; B62D 57/032; G05B 15/00
USPC ...................... 700/245–264; 901/1
See application file for complete search history.

(56) References Cited

U.S. PATENT DOCUMENTS

| | | | | |
|---|---|---|---|---|
| 5,402,050 | A * | 3/1995 | Ozawa | 318/568.12 |
| 5,838,130 | A * | 11/1998 | Ozawa | 318/568.2 |
| 5,974,366 | A * | 10/1999 | Kawai et al. | 702/150 |
| 6,177,776 | B1 * | 1/2001 | Kawai et al. | 318/568.12 |
| 6,317,652 | B1 * | 11/2001 | Osada | 700/245 |
| 7,496,428 | B2 * | 2/2009 | Takenaka et al. | 700/245 |
| 7,805,218 | B2 * | 9/2010 | Nagasaka | 700/245 |
| 7,860,611 | B2 * | 12/2010 | Takenaka et al. | 700/245 |
| 7,881,824 | B2 * | 2/2011 | Nagasaka et al. | 700/260 |
| 8,005,573 | B2 * | 8/2011 | Takenaka et al. | 700/260 |
| 2006/0025888 | A1* | 2/2006 | Gutmann et al. | 700/245 |
| 2011/0077775 | A1* | 3/2011 | Nagasaka et al. | 700/254 |
| 2012/0245734 | A1* | 9/2012 | Yun et al. | 700/253 |

OTHER PUBLICATIONS

Kwon, Gait Transitions for Walking and Running of Biped Robots, 2003, IEEE.*

(Continued)

*Primary Examiner* — Jason Hollaway
*Assistant Examiner* — Rachid Bendidi
(74) *Attorney, Agent, or Firm* — Patterson & Sheridan LLP

(57) ABSTRACT

Techniques are disclosed for optimizing and maintaining cyclic biped locomotion of a robot on an object. The approach includes simulating trajectories of the robot in contact with the object. During each trajectory, the robot maintains balance on the object, while using the object for locomotion. The approach further includes determining, based on the simulated trajectories, an initial state of a cyclic gait of the robot such that the simulated trajectory of the robot starting from the initial state substantially returns to the initial state at an end of one cycle of the cyclic gait. In addition, the approach includes sending joint angles and joint velocities of the initial state to a set of joint controllers of the robot to cause a leg of the robot to achieve the initial state so the robot moves through one or more cycles of the cyclic gait.

18 Claims, 6 Drawing Sheets

(56) References Cited

OTHER PUBLICATIONS

M. Stilman; J.-U. Schamburek; J. Kuffner; and T. Asfour, "Manipulation Planning Among Movable Obstacles", in Proc. IEEE Int. Conf. Robot, Automat., Roma, Italy, 2007, pp. 3327-3332.

Y. Zheng and K. Yamane, "Ball Walker: A Case Study of Humanoid Robot Locomotion in Non-Stationary Environments", in Proc. IEEE Int. Cont. Robot, Automat., Shanghai, China, 2011, to appear.

T. McGeer, "Passive Dynamic Walking", Int. J. Robot, Res., vol. 9, No. 2, pp. 62-82, 1990.

A. Goswami; B. Thuilot; and B. Espiau, "A Study of the Passive Gait of a Compass-Like Biped Robot: Symmetry and Chaos", Int. J. Robot, Res., vol. 17, No. 12, pp. 1282-1301, 1998.

M. Garcia; A. Chatterjee; A. Ruina; and M. Coleman, "The Simplest Walking Model: Stability, Complexity, and Scaling", ASME J. of Biomech, Eng., vol. 120, pp. 281-288, 1998.

K. Osuka nad K. Kirihara, "Motion Analysis and Experiments of Passive Walking Robot Quartet II", in Proc. IEEE Int. Conf. Robot, Automat., San Francisco, CA, 2000, pp. 3052-3056.

S.H. Collins; M. Wisse; and A. Ruina, "A Three-Dimensional Passive-Dynamic Walking Robot With Two Legs and Knees", Int. J. Robot, Res., vol. 20, No. 7, pp. 607-615, 2001.

Y. Ikemata; S. Akihito; and H. Fujimoto, :Analysis of Limit Cycle in Passive Walking, in Proc. IEEE/RSJ Int. Conf. Intell. Robots Syst., Las Vegas, Nevada, 2003, pp. 601-606.

Y. Ikemata; K. Yasuhara; A. Sano; and H. Fujimoto, "Generation and Local Stabilization of Fixed Point Based on a Stability Mechanism of Passive Working", in Proc. IEEE Int. Conf. Robot, Automat., Pasadena, CA, 2008, pp. 1588-1593.

L.B. Freidovich; U. Mettin; A.S. Shiriaev; and M.W. Spong, "A Passive 2-DOF Walker: Hunting for Gaits Using Virtual Holonomic Constraints", IEEE Trans. Robot., vol. 25, No. 5, pp. 1202-1208, 2009.

A.D. Kuo, "Energetics of Actively Powered Locomotion Using the Simplest Walking Model", ASME J. of Biomech, Eng., vol. 124, No. 2, pp. 113-120, 2002.

E. Dertien, "Dynamic Walking With Dribbel", IEEE Robot, Automat, Mag., vol. 13, No. 3, pp. 118-121, 2006.

Y. Harada; J. Takahashi; D. Nenchev; and D. Sato, "Limit Cycle Based Walk of a Powered 7DOF 3D Biped With Flat Feet", in Proc, IEEEE/RSJ Int. Conf. Intell, Robots Syst., Taipei, Taiwan, 2010, pp. 3632-3628.

D.E. Whitney, "Resolved Motion Rate Control of Manipulators and Human Prostheses", IEEE Trans, Man, Mach. Syst., vol. 10, No. 2, pp. 47-53, 1969.

\* cited by examiner

ROBOT CYCLIC LOCOMOTION USING A DYNAMIC OBJECT

BACKGROUND

Building robots as capable as, or more capable than, humans is one of the ultimate goals in humanoid robotics. To this end, researchers have developed robots capable of ordinary human tasks such as walking and running as well as tasks that are difficult for humans to perform, such as flipping and juggling.

Further, researchers have developed techniques for controlling and planning robot tasks under some dynamic environments and external disturbances. However, these techniques often focus on passive adaptation to dynamic changes in the environment. That is, the dynamic environment is treated as a disturbance that is merely absorbed by a controller to maintain the robot motion. The robot does not create or manipulate the dynamic conditions to perform the task.

SUMMARY

One aspect of the disclosure provides a computer implemented method, which includes simulating one or more trajectories of a robot in contact with a secondary object. During each of the one or more trajectories, the robot maintains balance on the secondary object, and the robot uses the secondary object for locomotion. The approach further includes determining, based on the simulated trajectories, a first initial state of a cyclic gait of the robot such that the simulated trajectory of the robot starting from the first initial state substantially returns to the first initial state at an end of one cycle of the cyclic gait. In addition, the approach includes sending joint angles and joint velocities of the first initial state to a set of joint controllers of the robot to cause a leg of the robot to achieve the first initial state and the robot to move through one or more cycles of the cyclic gait.

Other aspects include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects of the disclosure.

DETAILED DESCRIPTION

Figure 1:
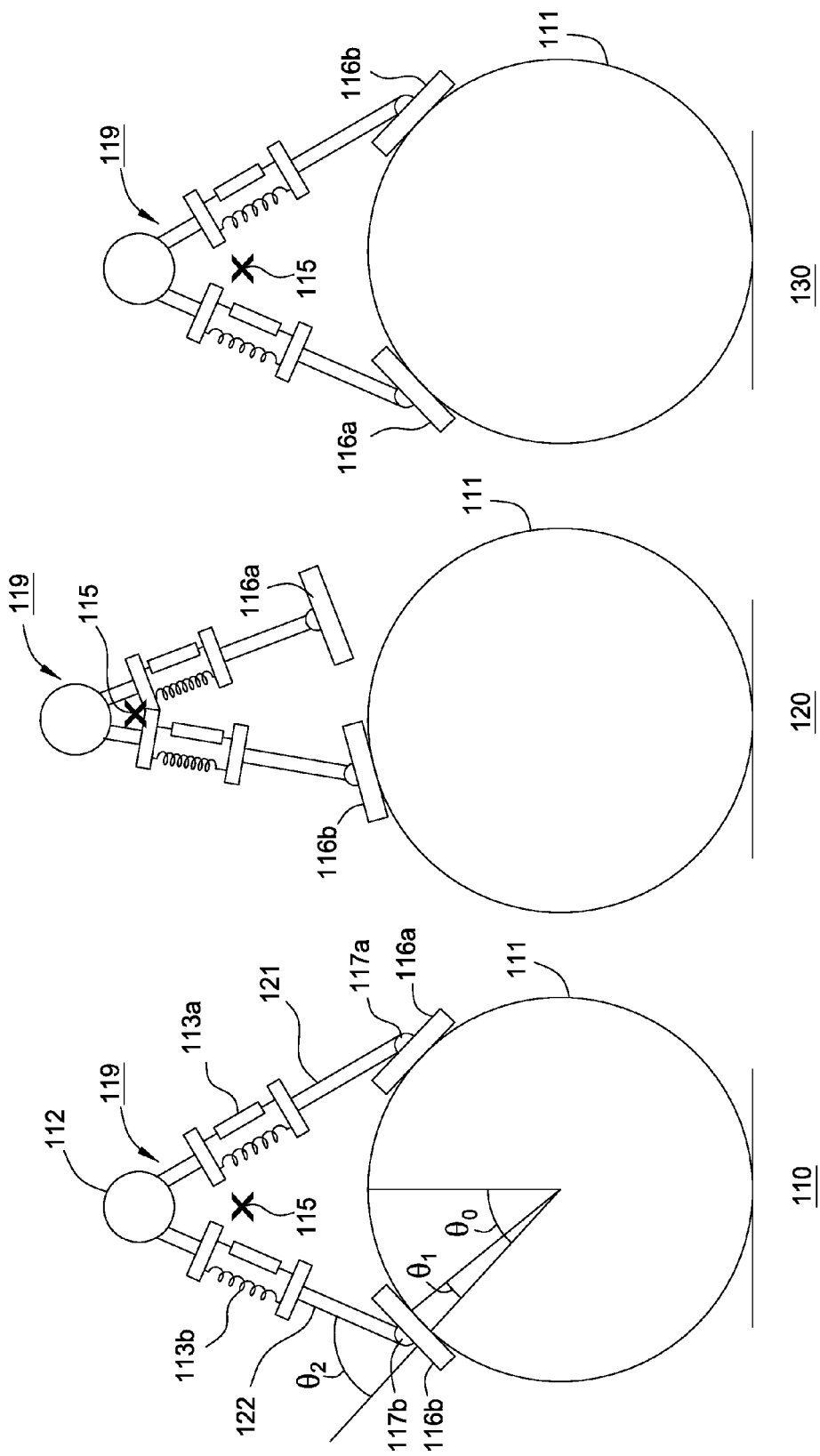
FIG. 1 depicts a cyclic gait of a model biped robot, representing a robot, using a dynamic object, according to one aspect of the disclosure.

Aspects presented herein provide techniques that enable humanoid robot locomotion on a rolling ball. In particular, aspects permit the robot to intentionally manipulate the ball to move forward while maintaining balance on the ball.

In one aspect, a computer is configured to determine a planned cyclic gait by minimizing a cost function with the following terms: (1) difference (also referred to herein as the "error") in initial and final state center-of-mass (CoM) positions and (2) difference in initial and final state joint velocities. As used herein, a planned cyclic gait includes at least an initial state having joint angles and joint trajectories such that the robot can execute a cyclic gait after a leg of the robot is placed in the initial state.

As the robot performs the planned cyclic gait, the computer is further configured to determine plans for individual steps so as to correct any deviations from the cyclic gait as originally planned (i.e., to maintain the original planned cyclic gait). Specifically, the joint angles of a swinging leg before the swinging leg collides with on object at the next step of the cyclic gait are computed via inverse kinematics so that the CoM of the robot will be the same as the CoM of the robot before the swinging leg collides with the object in the planned cyclic gait and so that the robot will be able to make contact with the ball. Further, the joint velocities are calculated to minimize a cost function with the following terms: (1) difference in initial and final state center-of-mass (CoM) positions and (2) difference between the initial states of two successive steps (i.e., the difference between the initial state of one cycle and the final state of that cycle).

Note, the discussion below generally describes robot locomotion on a rolling ball as an example of locomotion using a dynamic object. Of course, one of ordinary skill in the art will recognize that the techniques for configuring robot locomotion on a rolling ball may be adapted to model and perform other forms of locomotion using other dynamic objects, such as cylinders. Further, the discussion below provides a model for locomotion on a rolling ball in two dimensions (i.e., locomotion in a generally linear direction). One of ordinary skill in the art will appreciate that the discussed techniques may be generalized to three dimensions (i.e., to a gait that can include curves in forward direction).

Additionally, the following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, aspects and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 depicts a cyclic gait of a model biped robot, representing an actual robot (not shown), on a rolling ball in two dimensions, according to one aspect of the disclosure. The gait of the robot model 119 may be readily mapped to a gait of the actual robot. As shown, the sequence of motions beginning with one foot, the right foot 116b, in the initial state in panel 110 and ending with the other foot, the left foot 116b, in the initial state in panel 130 are alternatively referred to herein as a step or a cycle of the cyclic gait. In panel 110, the robot model 119, which is a simplified representation of a physical robot, begins one cycle with left foot 116a in front of right foot 116b. At the beginning of each cycle, one foot of the robot model 119 collides with the ball 111 while the other foot lifts off of the ball 111. The state of the colliding foot immediately before its collision with the ball is referred to herein as the initial state of that foot for the cycle.

In FIG. 1, the colliding foot is the left foot 116a and the lifting foot (also referred to herein as the swinging foot) is the right foot 116b. In one aspect, the collision itself may be modeled via a collision model, as described more fully below in conjunction with FIG. 2. Following the initial state, the foot that collided with the ball 111 moves along and maintains contact with the surface of the ball 111, thereby supporting the robot on the ball (i.e., the foot/leg acts a supporting foot/leg), while the lifted foot swings backwards without contacting the surface of the ball 111 (as shown in panel 120). In panel 130, the supporting leg is about to leave the ball, and this state of the supporting leg is referred to herein as the "final state" achieved at the end of a cycle. Further, in panel 130, the swinging foot of the robot achieves the initial state that the other food began in at the end of the cycle. This initial state may not be achieved exactly because of disturbances or modeling errors.

In order for the robot, represented by the robot model 119, to maintain balance on the ball, a balance controller may be designed. In particular, the balance controller may be designed to continuously try to bring the robot model 119 to an equilibrium state balanced on the ball 111. After one leg of the robot model 119 is placed in the initial state, the action of the balance controller in attempting to bring the robot model 119 to the equilibrium state may cause the robot to undertake a cycle of a cyclic gait. Further, given the balance controller and a collision model, described more fully below, the motion of the supporting leg and foot during a cyclic gait are uniquely determined by the initial state shown in panel 110. As a result, for any given step duration and average velocity, an initial state can be determined so as to allow the robot model 119 (and in turn the actual robot) to realize a cyclic gait by achieving the determined initial state.

In one aspect, the balance controller may be based on the robot model 119 depicted in FIG. 1. The robot model 119 includes two feet 116a and 116b, a lump mass 112, ankle joints 117a and 117b, and two sets of springs and dampers 113 and 114. Let $r_0$, $l_0$, $I_0$, $m_1$, $I_1$, $m_2$, $I_2$ and $L=L_0+l$ respectively denote radius, mass, and inertia of a ball 111; mass and inertia of a robot foot; mass and inertia of an inverted pendulum; and distance between an ankle joint 117a-b and lump mass 112, where $L_0$ is distance while the robot model 119 is in a rest position and/is a change of distance when the robot model 119 deviates from the rest position. Further, let $\theta_0$, $\theta_1$, and $\theta_2$ respectively denote roll angle of the ball 111, relative rotation of the supporting foot on the ball 111, and the angle of the corresponding ankle joint. Assuming the CoM of each foot 116a-b is at the respective ankle and that there is no slip between the feet 116a-b and the ball 111, then the linearized equation of motion during single support need not account for the swinging foot and can be written as $$M\ddot{\theta}+G\theta=\tau \qquad (1)$$

where $\theta=[\theta_0\ \theta_1\ \theta_2\ l]^T$, $\tau=[0\ 0\ \tau_2\ f]^T$, $\tau_2$ is the ankle torque, f is the spring-damper force, and $$M = \begin{bmatrix} M_1+I & M_2+I_1 & M_2 & 0 \\ M_2+I_1 & M_3+I_1 & M_3 & 0 \\ M_2 & M_3 & M_3 & 0 \\ 0 & 0 & 0 & m_2 \end{bmatrix},$$

-continued $$G = -\begin{bmatrix} G_1 + m_2gL_0 & m_2gL_0 & m_2gL_0 & 0 \\ m_2gL_0 & m_2gL_0 - G_1 & m_2gL_0 - G_1 & 0 \\ m_2gL_0 & m_2gL_0 & m_2gL_0 & 0 \\ 0 & 0 & 0 & m_2 \end{bmatrix},$$

$$M_1 = m_0 r_0^2 + 4m_1 r_0^2 + m_2 L_1^2,$$

$$M_2 = m_2 L_0 L_1 + I_2,$$

$$M_3 = m_2 l_0^2 + I_2,$$

$$L_1 = 2r_0 + L_0,$$

$$I = I_0 + I_1 + I_2,$$

and $$G_1 = (m_1 + m_2)gr_0.$$

Equation (1) may be rewritten as a state-space differential equation $$\dot{x} = Ax + Bu \qquad (2)$$

where $x = [\theta^T \ \dot{\theta}^T]^T$ is the state, $u = [\tau_2 \ f]^T$ is the input, and the matrices A and B are given by $$A = \begin{bmatrix} 0_{4\times4} & I_{4\times4} \\ -M^{-1}G & 0_{4\times4} \end{bmatrix},$$

$$B = \begin{bmatrix} 0_{4\times2} \\ M^{-1} \begin{bmatrix} 0 & 0 \\ 0 & 0 \\ 1 & 0 \\ 0 & 1 \end{bmatrix} \end{bmatrix}.$$

Further, a state-feedback controller may satisfy $$u = K(x^* - x) \qquad (3)$$

where $K \in \mathbb{R}^{2\times8}$ is a feedback gain and $x^*$ is an equilibrium state such that $Ax^* = 0$. The first row of K consists of feedback gains for generating $\tau_2$, while the second row of K includes the spring and damper coefficients for generating f. Since A here has full rank, $x^* = 0$ is the only equilibrium state. Substituting equation (3) into equation (2) yields $$\dot{x} = (A - BK)x \qquad (4)$$

Further, solving for x in equation (4) gives $$x = e^{(A-BK)t} x_0 \qquad (5)$$

where $x_0$ is the initial state. The feedback gain K may be chosen to ensure that all the eigenvalues of A−BK have negative real parts and the system asymptotically converges to the equilibrium state.

Figure 2:
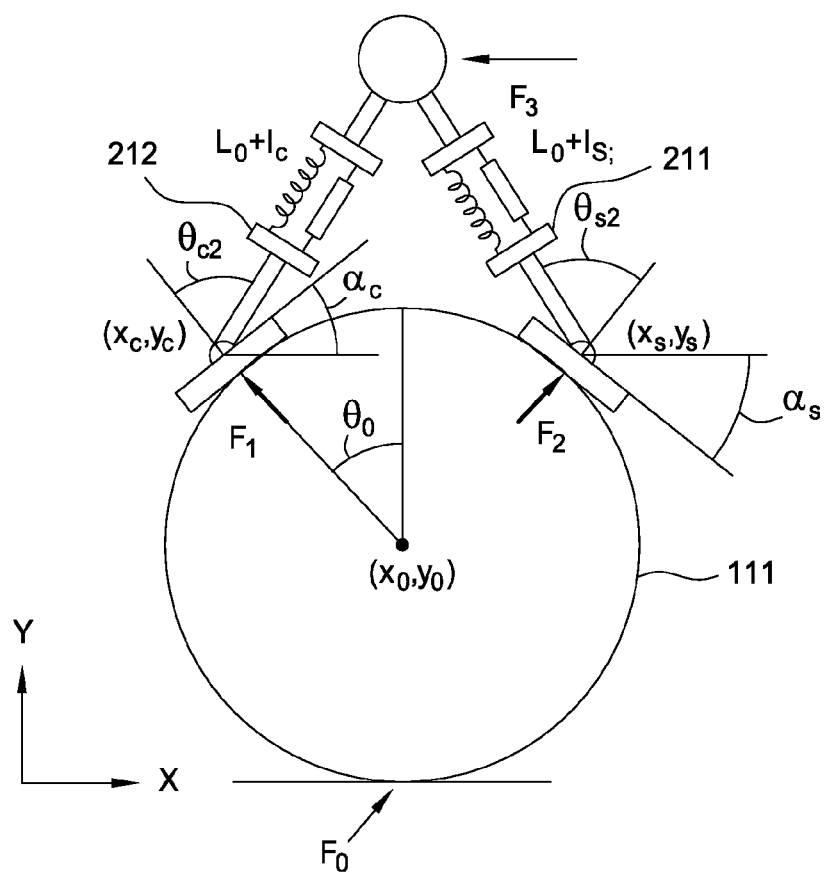
FIG. 2 depicts a collision model, according to one aspect of the disclosure.

FIG. 2 depicts a two-dimensional collision model, according to one aspect of the disclosure. A collision model may be used to model the change of state of a system upon the collision of the ball 111 by the swinging leg. As shown in FIG. 2, the configuration of the ball may be represented by the position $(x_0, y_0)$ and the orientation $\theta_0$ of the ball 111. The configuration of legs is determined by the following parameters: the position of the ankle joints for the colliding (i.e., swinging) leg 121, given by $(x_c, y_c)$, and the supporting leg 122, given by $(x_s, y_s)$; the angle of each foot 116a-b with respect to a horizontal plane $\alpha_c$ and $\alpha_s$; the angular variable $\theta_2$ discussed above with respect to FIG. 1; and the linear variable l, also discussed above with respect to FIG. 1. With the foregoing parameters, the configurations of the ball 111, the swinging leg 121, and the supporting leg 122 may be described respectively by the following vectors:

$$q_o = [x_o \ y_o \ \theta_o]^T \qquad (6)$$

$$q_c = [x_c \ y_c \ \alpha_c \ \theta_{c2} l_c]^T \qquad (7)$$

$$q_s = [x_s \ y_s \ \alpha_s \ \theta_{s2} l_s]^T \qquad (8)$$

where the subscripts "o," "c," and "s" represent the ball, the swing leg, and the supporting leg, respectively. The position of the contact between the ball and the floor can be expressed in terms of $q_o$ of equation (6) as $$p_F = \begin{bmatrix} x_o - r_0\theta_0 \\ y_o - r_0 \end{bmatrix} \qquad (9)$$

Then the Jacobian matrix of $p_F$ with respect to $q_0$ is $$J_{FO} = \frac{\partial p_F}{\partial q_o} = \begin{bmatrix} 1 & 0 & -r_0 \\ 0 & 1 & 0 \end{bmatrix} \qquad (10)$$

The position of the contact between the ball 111 and the swing leg 121 can be expressed as $$p_{CO} = \begin{bmatrix} x_o + r_0\theta_0\cos\alpha_c \\ y_o - r_0\theta_0\sin\alpha_c \end{bmatrix} \qquad (11)$$

Then the Jacobian matrix of $p_{CO}$ with respect to $q_0$ is $$J_{CO} = \frac{\partial p_{CO}}{\partial q_o} = \begin{bmatrix} 1 & 0 & r_0\cos\alpha_c \\ 0 & 1 & -r_0\sin\alpha_c \end{bmatrix} \qquad (12)$$

The position of the contact between the swing leg and the ball on the lag can be expressed in terms of $q_c$ as $$p_{CO} = \begin{bmatrix} x_c - \lambda\cos\alpha_c \\ y_c + \lambda\sin\alpha_c \end{bmatrix} \qquad (13)$$

where $\lambda = (x_c - x_o)\cos\alpha_c - (y_c - y_o)\sin\alpha_c$ is treated as a constant. Then the Jacobian matrix of $p_{oc}$ with respect to $q_c$ may be determined from $$J_{OC} = \frac{\partial p_{OC}}{\partial q_c} = \begin{bmatrix} 1 & 0 & \lambda\sin\alpha_c & 0 & 0 \\ 0 & 1 & \lambda\cos\alpha_c & 0 & 0 \end{bmatrix} \qquad (14)$$

The CoM position can be expressed in terms of $q_c$ as $$p_{MC} = \begin{bmatrix} x_c + Ls_c \\ y_c + Lc_c \end{bmatrix} \qquad (15)$$

where $s_c = \sin(\alpha_c + \theta_{c2})$ and $c_c = \cos(\alpha_c + \theta_{c2})$. Then the Jacobian matrix of $p_{MC}$ with respect to $q_c$ may be expressed as $$J_{MC} = \frac{\partial p_{MC}}{\partial q_c} = \begin{bmatrix} 1 & 0 & L_{c_c} & L_{c_c} & s_c \\ 0 & 1 & -L_{s_c} & -L_{s_c} & c_c \end{bmatrix} \quad (16)$$

Similarly, the Jacobian matrices $J_{SO}$, $J_{OS}$, and $J_{MS}$ for the supporting leg can be calculated by substituting $q_s$ in place of $q_c$ in the foregoing equations.

Conservation of momentum implies:

$$M_O(\dot{q}_O^+ - \dot{q}_O^-) = J_{FO}^T F_0 - J_{CO}^T F_1 - J_{SO}^T F_2 \quad (17)$$

$$M_C(\dot{q}_C^+ - \dot{q}_C^-) = J_{OC}^T F_1 - J_{MC}^T F_3 \quad (17a)$$

$$M_S(\dot{q}_S^+ - \dot{q}_S^-) = J_{OS}^T F_2 - J_{MC}^T F_3 \quad (17b)$$

where $\dot{q}_O$, $\dot{q}_C$, $\dot{q}_S$ a denote respectively the velocities of the ball, the swing leg, and the supporting leg; the superscripts − and + distinguish quantities before and after collision; $F_0$, $F_1$, $F_2$, and $F_3$ denote the impulses at three contacts and the hip joint, respectively, as depicted in FIG. 2; and $$M_O = \begin{bmatrix} m_0 & 0 & 0 \\ 0 & m_0 & 0 \\ 0 & 0 & I_0 \end{bmatrix},$$

$$M_C = \begin{bmatrix} m_1 + m_2 & 0 & m_2 L_{c_c} & m_2 L_{s_c} & m_2 s_c \\ 0 & m_1 + m_2 & -m_2 L_{s_c} & -m_2 L_{s_c} & m_2 c_c \\ m_2 L_{c_c} & -m_2 L_{s_c} & M_3 + I_1 & M_3 & 0 \\ m_2 L_{c_c} & -m_2 L_{s_c} & M_3 & M_3 & 0 \\ m_2 s_c & m_2 c_c & 0 & 0 & m_2 \end{bmatrix},$$

and $M_S$ has the same form as $M_C$ by replacing $s_c$ and $c_c$ with $s_s = \sin(\alpha_s + \theta_{s2})$ and $c_s = \cos(\alpha_s + \theta_{s2})$, respectively.

In addition, the collision model may account for various constraints, including friction, pure rolling of the ball 111, no slipping at the contact between the swing leg 121 and the ball 111 after collision, no slipping at the contact between the supporting leg 122 and the ball 111, and equality of the linear velocities of the hip joint as calculated from the swing and supporting legs.

The friction constraint may be expressed as the following linear inequality constraints:

$$N_0^T F_0 \geq 0_{2\times 1}, \quad N_1^T F_1 \geq 0_{2\times 1}, \quad N_2^T F_2 \geq 0_{2\times 1} \quad (18)$$

where $$N_0^T = \begin{bmatrix} 1 & \mu \\ -1 & \mu \end{bmatrix},$$

$$N_1^T = \begin{bmatrix} \mu\sin\alpha_c + \cos\alpha_c & \mu\cos\alpha_c - \sin\alpha_c \\ \mu\sin\alpha_c + \cos\alpha_c & -\mu\cos\alpha_c + \sin\alpha_c \end{bmatrix},$$

$$N_2^T = \begin{bmatrix} \mu\sin\alpha_s + \cos\alpha_s & \mu\cos\alpha_s - \sin\alpha_s \\ \mu\sin\alpha_s + \cos\alpha_s & -\mu\cos\alpha_s + \sin\alpha_s \end{bmatrix},$$

and $\mu$ is the friction coefficient.

Pure rolling of the ball on the floor requires the following equations to be satisfied:

$$J_{FO}\dot{q}_O^- = 0_{2\times 1} \quad (19a)$$

$$J_{FO}\dot{q}_O^+ = 0_{2\times 1} \quad (19b)$$

To avoid slipping at the contact between the swing leg 121 and the ball 111 after collision requires the following equation to be satisfied:

$$J_{CO}\dot{q}_O^+ - J_{CO}\dot{q}_c^+ = 0_{2\times 1} \quad (20)$$

Further, to avoid slipping at the contact between the supporting leg 122 and the ball 111 requires the following equations to be satisfied:

$$J_{SO}\dot{q}_O^- - J_{OS}\dot{q}_s^- = 0_{2\times 1} \quad (21a)$$

$$J_{SO}\dot{q}_O^+ - J_{OS}\dot{q}_s^+ = 0_{2\times 1} \quad (21b)$$

Equality of the linear velocities of the hip joint as calculated from the swing and supporting legs the following equations to be satisfied:

$$J_{MS}\dot{q}_s^- - J_{MC}\dot{q}_c^- = 0_{2\times 1} \quad (22a)$$

$$J_{MS}\dot{q}_s^+ - J_{MC}\dot{q}_c^+ = 0_{2\times 1} \quad (22b)$$

Figure 3:
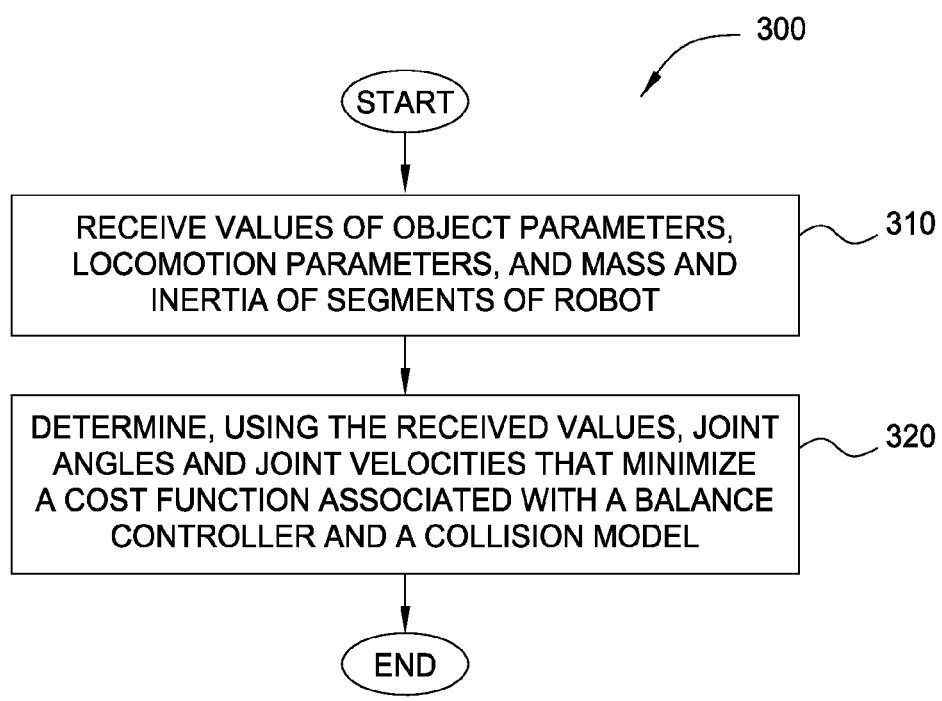
FIG. 3 is a flow diagram illustrating one aspect of a method for planning a cyclic gait of a biped robot using a dynamic object.

FIG. 3 is a flow diagram illustrating one aspect of a method 300 for planning a cyclic gait of a biped robot using a dynamic object. As shown, the method 300 begins at step 310, where a computer receives values of object parameters, locomotion parameters, as well as values of the mass and inertia of every link of the robot. For example, in the case of a robot walking on a rolling ball, the computer may receive values corresponding to average velocity of locomotion, step duration T, radius, mass, and inertia of a ball, and mass and inertia of every segment of the robot.

At step 320, the computer determines, using the received values, joint angles and joint velocities that minimize a cost function associated with the balance controller and the collision model described in conjunction with FIG. 1. More specifically, the computer determines an initial state $x_{s0} = [\theta_{s0}^T \; \dot{\theta}_{s0}^T]^T$ for the supporting leg 122 such that after a time T equal to the step duration, the swing leg 122 touches the ball 111 and achieves the same initial state for the next step. Because, as indicated by equation (5), the motion of the supporting leg 122 depends only on its initial state, the problem of solving for the initial state $x_{s0}$ may be reduced to an optimization problem.

In one aspect, the optimization problem may include minimizing a cost function with two parts: the difference between the initial and final CoM positions in a step and the difference between the initial states of two successive steps. Given the initial state $x_{s0}$, the final state $x_{sf}$, written as $x_{sf} = [\theta_{sf}^T \; \dot{\theta}_{sf}^T]^T$, can be obtained from equation (5). Specifically, the position of the CoM 115 relative to the center of the ball 111 may be determined using the equation $$p_s = \begin{bmatrix} r_0(\sin\theta_{s01} - \theta_{s1}\cos\theta_{s01}) + L\sin\theta_{s02} \\ r_0(\sin\theta_{s01} + \theta_{s1}\cos\theta_{s01}) + L\sin\theta_{s02} \end{bmatrix} \quad (23)$$

where $\theta_{s01} = \theta_{s0} + \theta_{s1}$ and $\theta_{s02} = \theta_{s01} + \theta_{s2}$. Let $p_{s0}$ and $p_{sf}$ denote the CoM 115 positions given by equation (23) at the initial state $x_{s0}$ and the final state $x_{sf}$, respectively. In order for joint angle $\theta_{c0} = [\theta_{c0} \; \theta_{c1} \; \theta_{c2} \; 1_c]^T$ of the swing leg 121 before and after collision to equal the initial joint angle $\theta_{s0}[\theta_{s0} \; \theta_{s1} \; \theta_{s2} \; 1_s]^T$ of the supporting leg, the CoM $p_{sf}$ must equal the CoM $p_{s0}$. As a result, the error between the CoM $p_{sf}$ and the CoM $p_{s0}$ needs to be minimized. That is, one term of the cost function to be minimized is the CoM error $e_{CoM}$ between the CoM of the initial and final positions of a cycle, and $e_{CoM}$ may be expressed as $$e_{CoM} = \frac{1}{2}(p_{sf} - p_{s0})^T W_p (p_{sf} - p_{s0}) \quad (24)$$

The second term of the cost function to be minimized is the difference between the initial states of two successive steps. Assume the joint angle $\theta_{c0}$ reaches the same value as joint angle $\theta_{s0}$, then the joint velocity $\dot{\theta}_{c0}$ should also equal joint velocity $\dot{\theta}_{s0}$. In one aspect, the value of $\dot{\theta}_{c0}$ is determined using the collision model described above with respect to FIG. 2. Specifically, the matrices $M_c$, $N_1$, $J_{CO}$, $J_{OC}$, and $J_{MC}$ in the collision model may be determined by taking $x_o=0$, $y_o=0$, $x_c=r_0 \sin(\theta_{s0}+\theta_{s1})-r_0\theta_{s1}\cos(\theta_{s0}+\theta_{s1})$, $y_c=r_0\cos(\theta_{s0}+\theta_{s1})+r_0\theta_{s1}\sin(\theta_{s0}+\theta_{s1})$, $\alpha_c=\theta_{s0}+\theta_{s1}$, and $\theta_{c2}=\theta_{s2}$, where $\theta_{s0}$, $\theta_{s1}$, and $\theta_{s2}$ are components of joint angle $\theta_{s0}$. $M_S$, $N_2$, $J_{SO}$, $J_{OS}$, and $J_{MS}$ may be determined by a similar approach, except that $\theta_{s0}$, $\theta_{s1}$, and $\theta_{s2}$ are components of joint angle $\theta_{sf}$.

In the collision model, the quantities to be determined include the velocities $\dot{q}_o^-$, $\dot{q}_o^+$, $\dot{q}_c^-$, $\dot{c}_o^+$, $\dot{q}_s^-$, $\dot{q}_s^+$ and the impulses $F_0$, $F_1$, $F_2$, $F_3$. The velocities $\dot{q}_o^-$ and $\dot{q}_s^-$ can be determined from $x_{sf}$ as $$\dot{q}_o^- = [r_0\theta_{s0} \; 0 \; \dot{\theta}_{s0}]^T \quad (25)$$

$$\dot{q}_s^- = [R_{11}\dot{\theta}_{s0}+R_{12}\dot{\theta}_{s1} \; R_{21}\dot{\theta}_{s0}+R_{22}\dot{\theta}_{s1} \; \dot{\theta}_{s01} \; \dot{\theta}_{s2} \; \dot{l}_s]^T \quad (26)$$

where $R_{11}=r_0(1+\cos\theta_{s01}+\theta_{s1}\sin\theta_{s01})$, $R_{12}=r_0\theta_{s1}\sin\theta_{s01}$, $R_{21}=r_0(\theta_{s1}\cos\theta_{s01}-\sin\theta_{s01})$, $R_{22}=r_0\theta_{s1}\cos\theta_{s01}$, $\theta_{s01}=\theta_{s0}+\theta_{s1}$, $\dot{\theta}_{s01}=\dot{\theta}_{s0}+\dot{\theta}_{s1}$ and $\theta_{s0}$, $\theta_{s1}$, $\dot{\theta}_{s0}$, $\dot{\theta}_{s1}$, and $\dot{\theta}_{s2}$ are components of $x_{sf}$. It can be verified that $\dot{q}_o^-$ and $\dot{q}_s^-$ satisfy equations (19a) and (21a), respectively.

The other contact constraints in equations (19)-(22), together with equation (17), can be rewritten in the matrix form as the underdetermined equation $$Q\dot{q} = b \quad (27)$$

where $$\dot{q} = [\dot{q}_o^+ \; \dot{q}_s^+ \; \dot{q}_c^+ \; \dot{q}_c^- \; F_0 \; F_1 \; F_2 \; F_3]^T \in \mathbb{R}^{26},$$

$$Q \in \mathbb{R}^{23 \times 26}, b \in \mathbb{R}^{23},$$

$$Q = \begin{bmatrix} M_O & 0_{3\times 5} & 0_{3\times 5} & 0_{3\times 5} & -J_{FO}^T & -J_{CO}^T & -J_{SO}^T & 0_{3\times 2} \\ 0_{5\times 3} & 0_{5\times 5} & -M_C & M_C & 0_{5\times 2} & J_{OC}^T & 0_{5\times 2} & J_{MC}^T \\ 0_{5\times 3} & M_S & 0_{5\times 5} & 0_{5\times 5} & 0_{5\times 2} & 0_{5\times 2} & -J_{OS}^T & J_{MS}^T \\ J_{FO} & 0_{2\times 5} & 0_{2\times 5} & 0_{2\times 5} & 0_{2\times 2} & 0_{2\times 2} & 0_{2\times 2} & 0_{2\times 2} \\ J_{CO} & 0_{2\times 5} & -J_{CO} & 0_{2\times 5} & 0_{2\times 2} & 0_{2\times 2} & 0_{2\times 2} & 0_{2\times 2} \\ J_{SO} & -J_{SO} & 0_{2\times 5} & 0_{2\times 5} & 0_{2\times 2} & 0_{2\times 2} & 0_{2\times 2} & 0_{2\times 2} \\ 0_{2\times 3} & 0_{2\times 5} & 0_{2\times 5} & J_{MC} & 0_{2\times 2} & 0_{2\times 2} & 0_{2\times 2} & 0_{2\times 2} \\ 0_{2\times 3} & J_{MS} & -J_{MC} & 0_{2\times 5} & 0_{2\times 2} & 0_{2\times 2} & 0_{2\times 2} & 0_{2\times 2} \end{bmatrix},$$

and $$b = [(M_O\dot{q}_o^-)^T \; 0_{1\times 5} \; (M_S\dot{q}_s^-)^T \; 0_{1\times 2} \; 0_{1\times 2} \; 0_{1\times 2} \; 0_{1\times 2} \; (J_{MS}\dot{q}_s^-)^T]^T.$$

The impulses $F_0$, $F_1$, $F_2$ may be further required to satisfy the friction constraint of equation (18), and based on $\dot{q}_o^+$ and $\dot{q}_s^+$, joint velocity $\dot{\theta}_{c0}$ may be derived as $$\dot{\theta}_{c0} = \begin{bmatrix} 0 & 0 & 1 & 0 & 0 & 0 & 0 & 0 \\ 0 & 0 & -1 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \begin{bmatrix} \dot{q}_o^+ \\ \dot{q}_s^+ \end{bmatrix} \quad (28)$$

$$= P\dot{q}$$

Based on the foregoing, the term of the optimization problem requiring minimizing the difference between the initial states of two successive steps may be expressed as minimizing $e_{state}$ subject to equations (18) and (27), where $$e_{state} = \text{minimize} \frac{1}{2}\|P\dot{q} - \dot{\theta}_{s0}\|^2 \quad (29)$$

The minimum object value of $e_{state}$ gives an error between joint velocity $\dot{\theta}_{c0}$ and joint velocity $\dot{\theta}_{s0}$, and it also gives an error between $x_{c0}$ and $x_{s0}$, since joint angle $\theta_{c0}$ is taken to be joint angle $\theta_{s0}$.

Combining the two terms of the cost function to be minimized gives the following function of $x_{s0}$:

$$E = e_{CoM} + e_{state} \quad (30)$$

where $e_{CoM}$ is given by equation (24) and $e_{state}$ is given by equation (29).

In one aspect, minimizing equation (30) includes simulating one or more trajectories of the robot model 119 in contact with the ball 111 and controlled by the balance controller described above with respect to FIG. 1 and choosing a simulated trajectory that minimizes equation (30).

In a further aspect, the optimization is subject to two constraints. A first constraint requires that the contact point between the supporting foot and the ball is within the sole during the entire step. And a second constraint requires that the ball roll at a predefined average velocity. The constraint of the contact point between the supporting foot and the ball being within the sole during the entire step limits $\theta_1$ to the range $$\left[-\frac{l_h}{r_0}, \frac{l_t}{r_0}\right].$$

From equation (5), $\theta_1 = \alpha_2^T x_{s0}$, where $\alpha_2^T$ is the second row of $e^{(A-BK)t}$. As a result, $\theta_1$ being limited to the range $$\left[-\frac{l_h}{r_0}, \frac{l_t}{r_0}\right]$$

can be expressed as:

$$-\frac{l_h}{r_0} \leq \max_{t \in [0,T]} |\alpha_2^T x_{s0}| \leq \frac{l_t}{r_0} \quad (31)$$

Based on equation (5), the constraint that the ball rolls at a predefined average velocity $\dot{\theta}_0^d$ can be expressed as $$(\alpha_1^T - e_1^T)x_{s0} = \dot{\theta}_0^d T \quad (32)$$

where $\alpha_1^T$ is the first row of $e^{(A-BK)t}$ and $e_1^T = [1 \; 0_{1\times 7}]$. Equation (32) implies that the initial state $x_{s0}$ for achieving a desired average velocity lies on a hyperplane with normal $\alpha_1$-$e_1$ in the state space. Combining equations (30) through (32) gives an optimization problem for computing the initial state $x_{s0}$ for the cyclic gait, for which the minimum value of E is zero:

$$\text{minimize E, subject to (31) and (32)} \tag{33}$$

In one aspect, minimizing equation (33) includes simulating one or more trajectories of the robot model 119 in contact with the ball 111 and controlled by the balance controller described above with respect to FIG. 1 and choosing a trajectory that minimizes equation (33).

Figure 4:
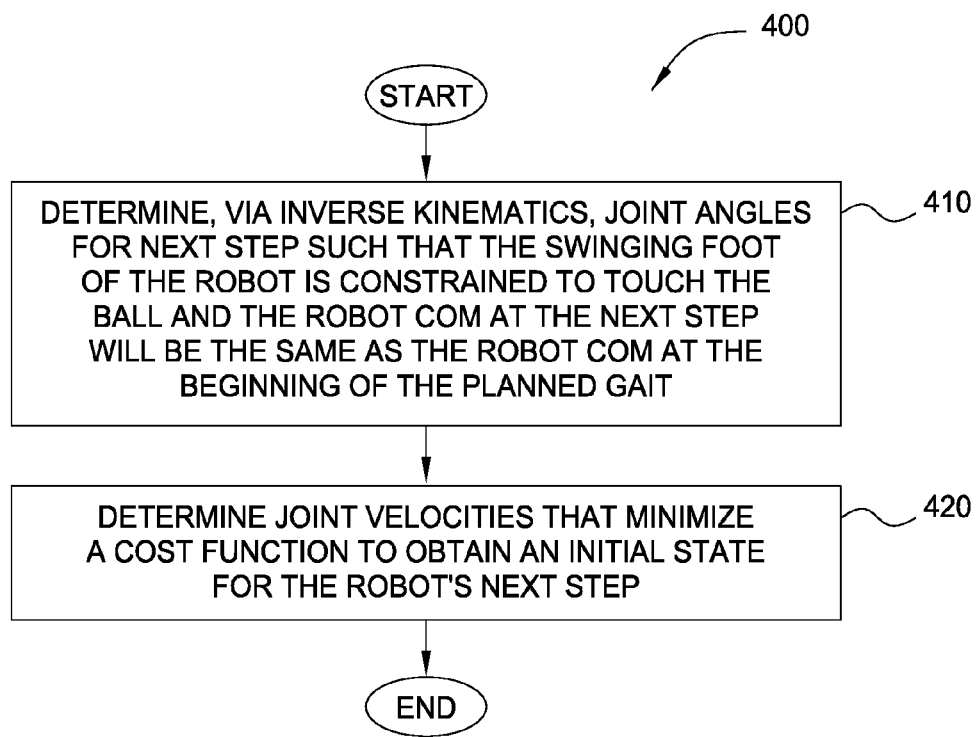
FIG. 4 is a flow diagram illustrating one aspect of a method for maintaining a planned cyclic gait of a biped robot using a dynamic object.

FIG. 4 is a flow diagram illustrating one aspect of a method 400 for maintaining a planned cyclic gait of a biped robot on a rolling ball. Although the cyclic gait is planned before any steps are taken, modeling errors and external disturbances may cause the position and/or velocity of the supporting leg 122 at the end of a cyclic gait to be different from the planned gait. As a result, the swing leg 121 may not reach the desired states for a new cyclic gait before and after collision. Method 400 is a technique for redetermining the state of the robot 119 so that the robot 119 can be made to recover its cyclic gait. That is, method 400 allows the robot to respond to, inter alia, modeling errors and dynamical forces that occur while performing the cyclic gait.

As shown, the method 400 begins at step 410, where a computer determines joint angles for a next step from inverse kinematics such that the swinging foot of the robot is constrained to touch the ball in the next step and the CoM of the robot at the next step will be the same as the CoM at the beginning of the planned cyclic gait. That is, the final CoM position $p_{sf}$, which may be obtained by equation (23) with respect to the final state $x_{sf}$ of a cycle, may deviate from the initial CoM position $p_{s0}$, and in such a case, the joint angle $\theta_{c0}$ cannot be the same as joint angle $\theta_{s0}$. A pseudoinverse method, or a damped least squares method that provides higher numerical stability near singularities, may be used to determine a value for the joint angle $\theta_{c0}$ such that $p_{sf}=p_{c0}$. Similar to equation (23), the CoM position $p_c$ with respect to $\theta_c$ may be expressed as $$p_c = \begin{bmatrix} r_0(\sin\theta_{c01} - \theta_{c1}\cos\theta_{c01}) + L\sin\theta_{c02} \\ r_0(\cos\theta_{c01} + \theta_{c1}\sin\theta_{c01}) + L\cos\theta_{c02} \end{bmatrix} \tag{34}$$

where $\theta_{c01}=\theta_{c0}+\theta_{c1}$ and $\theta_{c02}=\theta_{c01}+\theta_{c2}$. Starting with an initial value of $\theta_{c0}$, which can be taken to be $\theta_{s0}$, the pseudoinverse method performs the following iteration to compute $\theta_{c0}$ such that $p_{sf}=p_{c0}$:

$$\theta_{c0}=\theta_{c0}+J\dagger(p_{sf}-p_{c0}) \tag{35}$$

where $J=\partial p_c/\partial \theta_c \in \mathbb{R}^{2\times 4}$ is the Jacobian matrix of $p_c$ with respect to $\theta_c$ and $J\dagger$ is the pseudoinverse of J, $$J = \begin{bmatrix} r_0(1+\cos\theta_{c01}) + J_1 & J_1 & L\cos\theta_{c02} & \sin\theta_{c02} \\ J_2 - r_0\sin\theta_{c01} & J_2 & -L\sin\theta_{c02} & \cos\theta_{c02} \end{bmatrix},$$

$J_1=r_0\theta_{c1}\sin\theta_{c01}+L\cos\theta_{c02}$, and $J_2=r_0\theta_{c1}\cos\theta_{c01}-L\sin\theta_{c02}$. The iteration stops when $\|J\dagger(p_{sf}-p_{c0})\|$ is small enough.

At step 420, the computer determines joint velocities $\dot{\theta}_{c0}$ that minimize a cost function to obtain an initial state $x_{c0}$ for the robot to take another step. In one aspect, the collision model discussed with respect to FIG. 2 is applied, and the constraint of a desired average rolling velocity $\dot{\theta}_0^d$ is imposed.

As a result, $x_{c0}$ should satisfy equation (32), which can be rewritten as $$\alpha_{12}^T \dot{\theta}_{c0} = \dot{\theta}_0^d T = (\alpha_{11}^T - [1\ 0_{1\times 3}])\theta_{c0} \tag{36}$$

where $\alpha_{11}$ and $\alpha_{12}$ contain the first and last four components of $\alpha_1$, respectively. Equations (27), (28), and (36) can be combined into $$\begin{bmatrix} Q \\ a_{12}^T P \end{bmatrix} \dot{q} = \begin{bmatrix} b \\ \dot{\theta}_0^d T - (a_{11}^T - [1\ 0_{1\times 3}])\theta_{c0} \end{bmatrix} \tag{37}$$

Equation (37) can be solved for $\dot{q}$, from which $\dot{\theta}_{c0}$ is readily determinable using equation (28). However, equation (37) is underdetermined and has infinitely many solutions. As a result, the planned cyclic gait may be maintained by minimizing a cost function subject to equation (37).

In one aspect, minimizing the cost function includes minimizing a CoM error at the end of each step $e_{CoM}$ and minimizing an error in the initial state of each step $e_{state}$. From equations (5) and (28), the final state of a step after collision can be written as $$x_{cf} = e^{(A-BK)T} \begin{bmatrix} \theta_{c0} \\ P\dot{q} \end{bmatrix} \tag{38}$$

The CoM position $p_{cf}$ at the end of a step can be determined via equation (23). Since $\theta_{c0}$ was determined at step 410, it will be clear to persons skilled in the art that, based on equation (38), the final center of mass after collision $p_{cf}$ and the final state after collision $x_{cf}$ are functions of $\dot{q}$. Let $x_0^*=[\theta^*\ \dot{\theta}^*]^T$ be an optimal initial state for the planned cyclic gait and $p^*$ be the CoM position determined via equation (23) with respect to $x_0^*$. Then the error in the CoM position may be represented as $$e_{CoM} = \frac{1}{2}(p_{cf} - p)^T W_p (p_{cf} - p) \tag{39}$$

where $p=(1-k_p)p_{sf}+k_p p^*$ and $k_p \in [0, 1]$. Further, the error in the initial state of each step $e_{state}$ may be represented as $$e_{state} = \frac{1}{2}(\dot{\theta}_{c0} - \dot{\theta})^T W_s (\dot{\theta}_{c0} - \dot{\theta}) \tag{40}$$

where $\dot{\theta}=(1-k_s)\dot{\theta}_{s0}+k_s\dot{\theta}^*$ and $k_s \in [0, 1]$. Putting equations (39) and (40) together, the cost function may be defined as $e_{CoM}+e_{state}$, and solving for $\dot{q}$ is reduced to solving the optimization problem $$\text{minimize } e_{CoM}+e_{state}, \text{ subject to (37) and (38)} \tag{41}$$

In particular, using larger values for $k_p$ and $k_s$, the resulting gait may be closer to planned cyclic gait.

Figure 5:
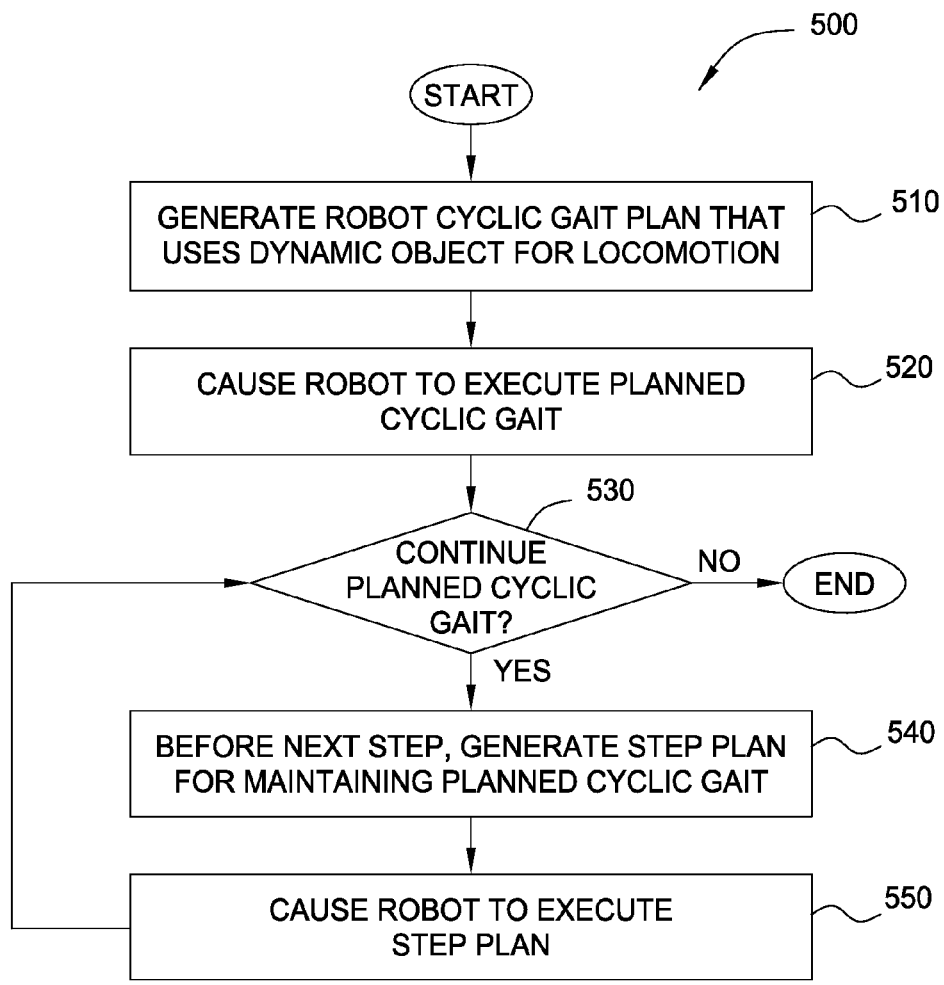
FIG. 5 is a flow diagram illustrating one aspect of a method for optimizing and controlling cyclic biped locomotion of a robot using a dynamic object.

FIG. 5 is a flow diagram illustrating one aspect of a method 500 for optimizing and controlling cyclic biped locomotion of a robot using a dynamic object in two dimensions. As shown, the method 500 begins at step 510, where a computer plans a cyclic gait such that the robot makes use of the dynamic object for locomotion. In one aspect, the computer generates the plan for the cyclic gait according to the steps described in detail with respect to FIG. 3.

The method continues at step 520, where the computer causes the robot to execute the cyclic gait planned at step 510.

In one aspect, the computer may send one or more commands to a controller capable of configuring the articulated link positions of the robot 119 by modifying the angles of joints of the robot 119.

While the robot is executing the planned cyclic gait, the computer determines at step 530 whether to continue the planned cyclic gait. Assuming the computer determines that the planned cyclic gait is to continue, then at step 540, the computer generates a plan for the next step that helps maintain the planned cyclic gait. In one aspect, the computer generates the plan for the next step according to the steps described in detail with respect to FIG. 4.

At step 550, the computer causes the plan for the next step to be executed by the robot. In one aspect, the computer may send one or more commands to a controller capable of configuring the articulated link positions of the robot 119 by modifying the angles of joints of the robot 119. Thereafter, the method 500 returns to step 530, where the computer determines if the robot will continue executing the planned cyclic gait. If the computer determines that the robot will stop executing the planned cyclic gait, then the method 500 ends.

Figure 6:
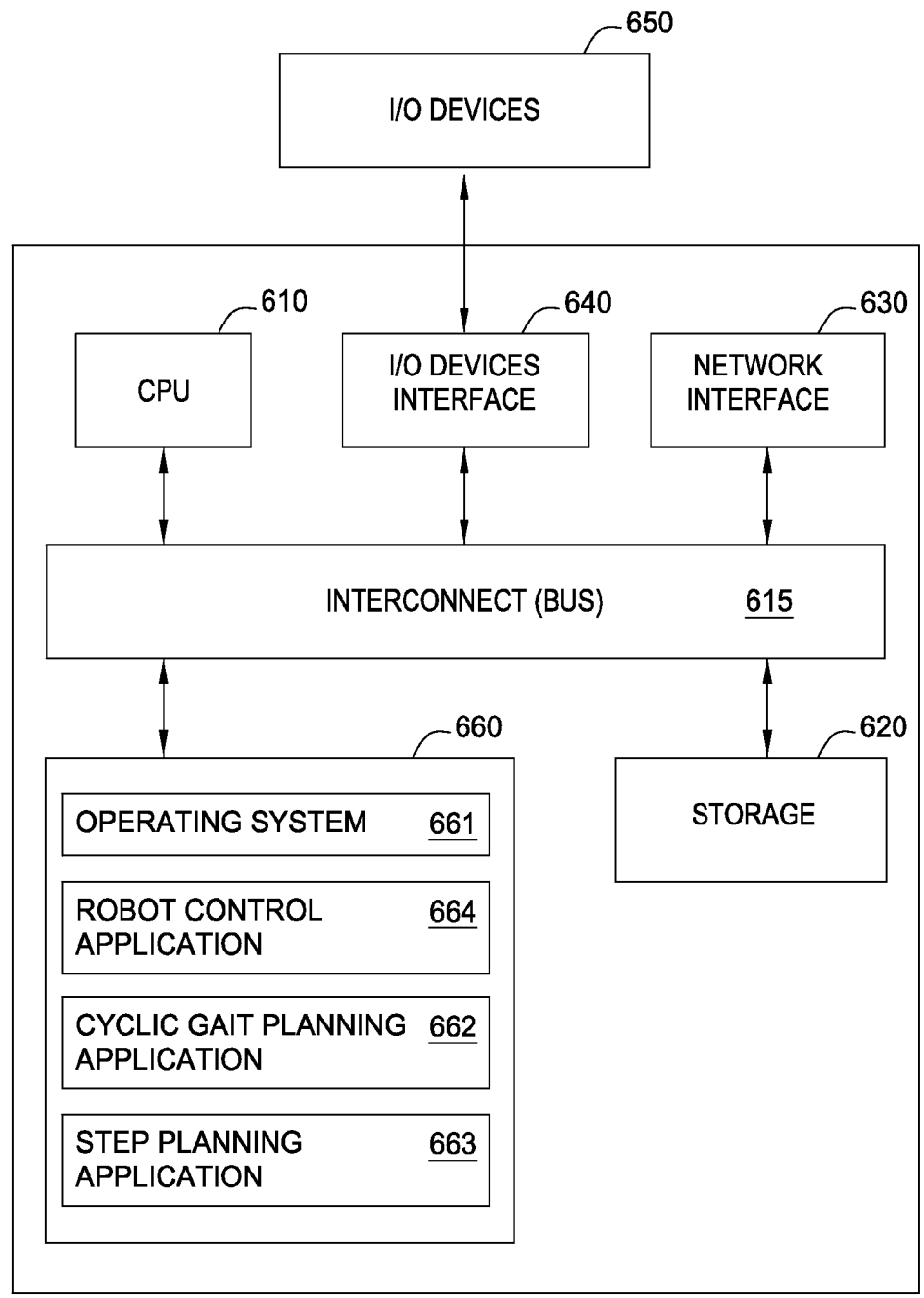
FIG. 6 depicts a block diagram of a system in which aspects of the disclosure may be implemented.

FIG. 6 illustrates an example of a system 600 in which aspects of the disclosure may be implemented. As shown, the system 600 includes, without limitation, a central processing unit (CPU) 610, a network interface 630, an interconnect 615, a memory 660 and storage 620. The system 600 may also include an I/O device interface 640 connecting I/O devices 650 (e.g., keyboard, display and mouse devices) to the system 600. The I/O devices 640 and 650 may include a controller capable of configuring the articulated link positions of a humanoid robot 151 by modifying the angles of joints of the humanoid robot 151.

The CPU 610 retrieves and executes programming instructions stored in the memory 660. Similarly, the CPU 610 stores and retrieves application data residing in the memory 660. The interconnect 615 facilitates transmission, such as of programming instructions and application data, between the CPU 610, I/O device interface 640, storage 620, network interface 630, and memory 660. CPU 610 is included to be representative of a single CPU, multiple CPUs, a single CPU having multiple processing cores, and the like. And the memory 660 is generally included to be representative of a random access memory. The storage 620 may be a disk drive storage device. Although shown as a single unit, the storage 620 may be a combination of fixed and/or removable storage devices, such as fixed disc drives, floppy disc drives, tape drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network. Also, the functions of controlling the joint articulation of a robot may be separate from the systems and applications described herein used to derive solutions for the robot to perform and maintain a cyclic gait using a dynamic object, and are included in system 600 for convenience of description.

As shown, the memory 660 includes an operating system 661 and applications 662-664. Illustratively, the operating system may include Microsoft's Windows®. The applications 662-664 include a cyclic gait planning application 662, which is configured to plan a cyclic gait for the robot 119 using a dynamic object for locomotion. In one aspect, the cyclic gait planning application 662 is configured to determine joint angles and joint velocities that minimize a cost function for a simplified dynamics model, as described in detail above with respect to FIG. 3. The applications 662-664 further include a step planning application 663, which is configured to plan a next step for the robot while the robot is executing the planned cyclic gait so as to maintain the planned cyclic gait. In one aspect, the step planning application 663 is configured to determine, via inverse kinematics, joint angles for the next step such that the robot CoM at the next step before swinging-leg collision will generally match the robot CoM of the planned gait before swinging-leg collision and to determine, via optimization, joint velocities that minimize a cost function, as described in detail above with respect to FIG. 4.

The applications 662-664 further include a robot control application 664, which may be configured to send signals to the robot 119 indicating the joint movements to be made in performing the planned cyclic gait and the planned step. That is, the robot control application 664 may convert the planned cyclic gait and the planned step, provided by the cyclic gait planning application 662 and the step planning application, respectively, to instructions that are sent to the robot 119, thereby causing the robot 119 to move according to those instructions.

Advantageously, aspects of the disclosure allow a computer to plan a cyclic gait for a robot that creates a dynamic environment for locomotion. Further, aspects of the disclosure allow a computer to plan an appropriate state for a swing leg before collision so as to maintain the planned cyclic gait.

While the foregoing is directed to aspects of the present disclosure, other and further aspects of the disclosure may be devised without departing from the basic scope thereof, and the scope thereof is determined by the claims that follow.

What is claimed is:

1. A computer-implemented method comprising:
simulating, via one or more processors, one or more trajectories of a robot in contact with a dynamic secondary object, wherein the robot maintains balance on the secondary object throughout each of the one or more simulated trajectories;
determining, based on the one or more simulated trajectories, a first initial state of a cyclic gait of the robot such that the simulated trajectory of the robot starting from the first initial state substantially returns to the first initial state at an end of one cycle of the cyclic gait; and
sending joint angles and joint velocities of the first initial state to a set of joint controllers of the robot to cause a leg of the robot to achieve the first initial state and to cause the robot to move through one or more cycles of the cyclic gait in motion with the secondary object,
wherein determining the first initial state includes:
substantially minimizing a difference between a simulated center-of-mass position of the first initial state and a simulated center-of-mass position of a final state, the final state being the state of the robot at the end of the one cycle of the cyclic gait, and
substantially minimizing a difference between simulated joint velocities of the first initial state and simulated joint velocities of the final state.

2. The computer-implemented method of claim 1, wherein the simulated trajectories account, via a collision model, for changes of state upon a leg of the robot colliding with the secondary object.

3. The computer-implemented method of claim 1, wherein the secondary object is a ball or a cylinder.

4. The computer-implemented method of claim 1, wherein determining the first initial state is subject to a constraint that the secondary object move at a predefined average velocity.

5. The computer-implemented method of claim 1, wherein determining the first initial state is subject to a constraint that a contact point between a supporting foot of the robot and the secondary object be within the sole of the supporting foot during an entirety of each step of the cyclic gait.

6. The computer-implemented method of claim 1, wherein determining the first initial state is subject to a friction constraint.

7. The computer-implemented method of claim 1, wherein simulating one or more trajectories includes modeling the robot as a lump mass, two feet, two ankle joints, and two sets of springs and dampers.

8. The computer-implemented method of claim 1, wherein the robot maintains balance on the secondary object via a balance controller which continuously attempts to return the robot to an equilibrium state.

9. The computer-implemented method of claim 1, further comprising:
   determining a difference between the simulated trajectory corresponding to the first initial state and an actual trajectory during a step of the cyclic gait;
   determining, based on the difference, a second initial state for a next step of the cyclic gait such that a trajectory of the robot starting from the second initial state is closer to the simulated trajectory corresponding to the first initial state than is a trajectory of the robot without correction; and
   sending joint angles and joint velocities of the second initial state to the set of joint controllers of the robot to cause the robot to undertake the next step of the cyclic gait.

10. The computer-implemented method of claim 9, wherein determining the second initial state includes:
   determining, via inverse kinematics, joint angles which permit a simulated center of mass of the robot at a collision of a swinging foot with the secondary object to be substantially equivalent, relative to the secondary object, to a simulated center of mass of the robot at a collision of the swinging foot with the secondary object according to the simulated trajectory corresponding to the first initial state; and
   substantially minimizing the difference between a simulated center-of-mass position of an initial state and a simulated center-of-mass position of a final state and the difference between simulated joint velocities of the initial state and simulated joint velocities of the final state, the final state being the state of the robot at the end of one cycle of the cyclic gait.

11. A non-transitory computer-readable storage medium storing a program, which, when executed by a processor performs an operation, the operation comprising:
   simulating one or more trajectories of a robot in contact with a dynamic secondary object, wherein the robot maintains balance on the secondary object throughout each of the one or more simulated trajectories;
   determining, based on the one or more simulated trajectories, a first initial state of a cyclic gait of the robot such that the simulated trajectory of the robot starting from the first initial state substantially returns to the first initial state at an end of one cycle of the cyclic gait; and
   sending joint angles and joint velocities of the first initial state to a set of joint controllers of the robot to cause a leg of the robot to achieve the first initial state and to cause the robot to move through one or more cycles of the cyclic gait in motion with the secondary object,
   wherein determining the first initial state includes:
      substantially minimizing a difference between a simulated center-of-mass position of the first initial state and a simulated center-of-mass position of a final state, the final state being the state of the robot at the end of the one cycle of the cyclic gait, and
      substantially minimizing a difference between simulated joint velocities of the first initial state and simulated joint velocities of the final state.

12. The computer-readable storage medium of claim 11, wherein the simulated trajectories account, via a collision model, for changes of state upon a leg of the robot colliding with the secondary object.

13. The computer-readable storage medium of claim 11, wherein the secondary object is a ball or a cylinder.

14. The computer-readable storage medium of claim 11, wherein determining the first initial state is subject to a constraint that the secondary object move at a predefined average velocity.

15. The computer-readable storage medium of claim 11, wherein determining the first initial state is subject to a constraint that a contact point between a supporting foot of the robot and the secondary object be within the sole of the supporting foot during an entirety of each step of the cyclic gait.

16. The computer-readable storage medium of claim 11, wherein the operation further comprises:
   determining a difference between the simulated trajectory corresponding to the first initial state and an actual trajectory during a step of the cyclic gait;
   determining, based on the difference, a second initial state for a next step of the cyclic gait such that a trajectory of the robot starting from the second initial state is closer to the simulated trajectory corresponding to the first initial state than is a trajectory of the robot without correction; and
   sending joint angles and joint velocities of the second initial state to the set of joint controllers of the robot to cause the robot to undertake the next step of the cyclic gait.

17. The computer-readable storage medium of claim 16, wherein determining the second initial state includes:
   determining, via inverse kinematics, joint angles which permit a simulated center of mass of the robot at a collision of a swinging foot with the secondary object to be substantially equivalent, relative to the secondary object, to a simulated center of mass of the robot at a collision of the swinging foot with the secondary object according to the simulated trajectory corresponding to the first initial state; and
   substantially minimizing the difference between a simulated center-of-mass position of an initial state and a simulated center-of-mass position of a final state and the difference between simulated joint velocities of the initial state and simulated joint velocities of the final state, the final state being the state of the robot at the end of one cycle of the cyclic gait.

18. A system, comprising:
   a balance controller which maintains balance of a robot in contact with a dynamic secondary object, the secondary object used by the robot during locomotion;
   a dynamics simulator to compute a trajectory of the robot in contact with the secondary object and controlled by the balance controller starting from an initial state;

a computer-implemented process for optimizing an initial state of a cyclic gait of the robot such that the trajectory of the robot starting from the initial state substantially returns to the initial state after one cycle of the gait; and a set of joint controllers to cause a leg of the robot to achieve the initial state and the robot to move through one or more cycles of the cyclic gait in motion with the secondary object, wherein optimizing the initial state includes:

substantially minimizing a difference between a simulated center-of-mass position of the initial state and a simulated center-of-mass position of a final state, the final state being the state of the robot at the end of the one cycle of the cyclic gait, and substantially minimizing a difference between simulated joint velocities of the initial state and simulated joint velocities of the final state.

* * * * *

UNITED STATES PATENT AND TRADEMARK OFFICE
CERTIFICATE OF CORRECTION

| | | |
|---|---|---|
| PATENT NO. | : 9,156,159 B2 | Page 1 of 5 |
| APPLICATION NO. | : 13/415605 | |
| DATED | : October 13, 2015 | |
| INVENTOR(S) | : Hodgins et al. | |

It is certified that error appears in the above-identified patent and that said Letters Patent is hereby corrected as shown below:

In the specification,

Column 4, Line 40, please delete "$l_o$," and insert -- $l_0$, -- therefor;

Column 4, Line 40, please delete "L=L$_0$+l" and insert -- $L = L_0 + l$ -- therefor;

Column 4, Line 45, please delete "and/is" and insert -- and $l$ is -- therefor;

Column 5, Line 67, please delete "l," and insert -- $l$, -- therefor;

Column 6, Line 7, please delete "q$_c$=[x$_c$y$_c$α$_c$θ$_{c2}$l$_c$]$^T$" and insert -- $q_c = [x_c\ y_c\ \alpha_c\ \theta_{c2}\ l_c]^T$ -- therefor;

Column 6, Line 10, please delete "q$_s$ = [x$_s$ y$_s$ α$_s$ θ$_{s2}$l$_s$]$^T$" and insert -- $q_s = [x_s\ y_s\ \alpha_s\ \theta_{s2}\ l_s]^T$ -- therefor;

Column 7, Line 14, please delete

"$M_O(\dot{q}_O^+ - \dot{q}_O^-) = J_{FO}{}^T F_0 - J_{CO}{}^T F_1 - J_{SO}{}^T F_2$"

and insert -- $M_O(\dot{q}_O^+ - \dot{q}_O^-) = J_{FO}^T F_0 - J_{CO}^T F_1 - J_{SO}^T F_2$ -- therefor;

Column 7, Line 16, please delete "$M_C(\dot{q}_C^+ - \dot{q}_C^-) = J_{OC}{}^T F_1 - J_{MC}{}^T F_3$"

and insert -- $M_C(\dot{q}_c^+ - \dot{q}_c^-) = J_{OC}^T F_1 - J_{MC}^T F_3$ -- therefor;

Column 7, Line 19, please delete "$M_S(\dot{q}_S^+ - \dot{q}_S^-) = J_{OS}{}^T F_2 - J_{MC}{}^T F_3$"

Signed and Sealed this
Seventh Day of June, 2016

Michelle K. Lee
*Director of the United States Patent and Trademark Office*

CERTIFICATE OF CORRECTION (continued)

and insert -- $M_S(\dot{q}_s^+ - \dot{q}_s^-) = J_{OS}^T F_2 - J_{MC}^T F_3$ -- therefor;

Column 8, Line 3, please delete "$J_{FO}\dot{q}_O^- = 0_{2\times 1}$" and insert -- $J_{FO}\dot{q}_o^- = 0_{2\times 1}$ -- therefor;

Column 8, Line 5, please delete "$J_{FO}\dot{q}_O^+ = 0_{2\times 1}$" and insert -- $J_{FO}\dot{q}_o^+ = 0_{2\times 1}$ -- therefor;

Column 8, Line 10, please delete "$J_{CO}\dot{q}_O^+ - J_{CO}\dot{q}_C^+ = 0_{2\times 1}$" and insert -- $J_{CO}\dot{q}_o^+ - J_{CO}\dot{q}_c^+ = 0_{2\times 1}$ -- therefor;

Column 8, Line 15, please delete "$J_{SO}\dot{q}_O^- - J_{OS}\dot{q}_s^- = 0_{2\times 1}$" and insert -- $J_{SO}\dot{q}_o^- - J_{OS}\dot{q}_s^- = 0_{2\times 1}$ -- therefor;

Column 8, Line 17, please delete "$J_{SO}\dot{q}_O^+ - J_{OS}\dot{q}_s^+ = 0_{2\times 1}$" and insert -- $J_{SO}\dot{q}_o^+ - J_{OS}\dot{q}_s^+ = 0_{2\times 1}$ -- therefor;

Column 8, Line 22, please delete "$J_{MS}\dot{q}_s^- - J_{MC}\dot{q}_c^- = 0_{2\times 1}$" and insert -- $J_{MS}\dot{q}_s^- - J_{MC}\dot{q}_c^- = 0_{2\times 1}$ -- therefor;

Column 8, Line 24, please delete "$J_{MS}\dot{q}_s^+ - J_{MC}\dot{q}_c^+ = 0_{2\times 1}$" and insert -- $J_{MS}\dot{q}_s^+ - J_{MC}\dot{q}_c^+ = 0_{2\times 1}$ -- therefor;

Column 8, Lines 39-40, please delete "$x_{sO} = [\theta_{sO}^T \; \dot{\theta}_{sO}^T]^T$" and

CERTIFICATE OF CORRECTION (continued)
U.S. Pat. No. 9,156,159 B2 insert -- $x_{s0} = \begin{bmatrix} \boldsymbol{\theta}_{s0}^T & \dot{\boldsymbol{\theta}}_{s0}^T \end{bmatrix}^T$ -- therefor;

Column 8, Line 51, please delete " $x_{sf} = [\theta_{sf}^T \; \dot{\theta}_{sf}^T]^T,$ " and insert -- $x_{sf} = \begin{bmatrix} \boldsymbol{\theta}_{sf}^T & \dot{\boldsymbol{\theta}}_{sf}^T \end{bmatrix}^T,$ -- therefor;

Column 8, Line 64, please delete "$\theta_{c0}=[\theta_{c0} \; \theta_{c1} \; \theta_{c2} \; l_c]^T$" and insert -- $\boldsymbol{\theta}_{c0} = [\theta_{c0} \; \theta_{c1} \; \theta_{c2} \; l_c]^T$ -- therefor;

Column 8, Line 65, please delete "$\theta_{s0}[\theta_{s0} \; \theta_{s1} \; \theta_{s2} \; l_s]^T$" and insert -- $\boldsymbol{\theta}_{s0} = [\theta_{s0} \; \theta_{s1} \; \theta_{s2} \; l_s]^T$ -- therefor;

Column 9, Line 24, please delete

" $\dot{q}_o^-, \; \dot{q}_o^+, \; \dot{q}_c^-, \; \dot{c}_o^+, \; \dot{q}_s^-, \; \dot{q}_s^+$ " and insert -- $\dot{\boldsymbol{q}}_o^-, \; \dot{\boldsymbol{q}}_o^+, \; \dot{\boldsymbol{q}}_c^-, \; \dot{\boldsymbol{q}}_c^+, \; \dot{\boldsymbol{q}}_s^-, \; \dot{\boldsymbol{q}}_s^+$ -- therefor;

Column 9, Line 25, please delete " $\dot{q}_o^-$ and $\dot{q}_s^-$ " and insert -- $\dot{\boldsymbol{q}}_o^-$ and $\dot{\boldsymbol{q}}_s^-$ -- therefor;

Column 9, Line 28, please delete " $\dot{q}_o^- = [r_0 \theta_{s0} \; 0 \; \dot{\theta}_{s0}]^T$ " and insert -- $\dot{\boldsymbol{q}}_o^- = \begin{bmatrix} r_0 \dot{\theta}_{s0} & 0 & \dot{\theta}_{s0} \end{bmatrix}^T$ -- therefor;

Column 9, Line 30, please delete

" $\dot{q}_s^- = [R_{11}\dot{\theta}_{s0} + R_{12}\dot{\theta}_{s1} \; R_{21}\dot{\theta}_{s0} + R_{22}\dot{\theta}_{s1} \; \dot{\theta}_{s01} \; \dot{\theta}_{s2} \; \dot{l}_s]^T$ " and insert -- $\dot{\boldsymbol{q}}_s^- = \begin{bmatrix} R_{11}\dot{\theta}_{s0} + R_{12}\dot{\theta}_{s1} & R_{21}\dot{\theta}_{s0} + R_{22}\dot{\theta}_{s1} & \dot{\theta}_{s01} & \dot{\theta}_{s2} & \dot{l}_s \end{bmatrix}^T$ -- therefor;

Column 9, Line 35, please delete " $\dot{q}_o^-$ and $\dot{q}_s^-$ " and insert -- $\dot{\boldsymbol{q}}_o^-$ and $\dot{\boldsymbol{q}}_s^-$ -- therefor;

CERTIFICATE OF CORRECTION (continued)
U.S. Pat. No. 9,156,159 B2

Column 9, Line 45, please delete

"$\dot{q} = [\dot{q}_o^+ \quad \dot{q}_s^+ \quad \dot{q}_c^+ \quad \dot{q}_c^- \quad F_0 \quad F_1 \quad F_2 \quad F_3]^T \in \mathbb{R}^{26},$" and insert -- $\dot{q} = [\dot{q}_o^+ \quad \dot{q}_s^+ \quad \dot{q}_c^+ \quad \dot{q}_c^- \quad F_0 \quad F_1 \quad F_2 \quad F_3]^T \in \mathbb{R}^{26},$ -- therefor;

Column 9, Line 62, please delete

"$[(M_0\dot{q}_o^-)^T \quad 0_{1\times 5} \quad (M_s\dot{q}_s^-)^T \quad 0_{1\times 2} \quad 0_{1\times 2} \quad 0_{1\times 2} \quad 0_{1\times 2} \quad (J_{MS}\dot{q}_s^-)^T]^T.$" and insert -- $[(M_0\dot{q}_o^-)^T \quad 0_{1\times 5} \quad (M_s\dot{q}_s^-)^T \quad 0_{1\times 2} \quad 0_{1\times 2} \quad 0_{1\times 2} \quad 0_{1\times 2} \quad (J_{MS}\dot{q}_s^-)^T]^T$ -- therefor;

Column 9, Line 66, please delete "$\dot{q}_o^+$" and insert -- $\dot{q}_o^+$ -- therefor;

Column 9, Line 67, please delete "$\dot{q}_s^+,$" and insert -- $\dot{q}_s^+,$ -- therefor;

Column 10, Line 47, please delete "$\theta_1 = \alpha_2^T x_{s0}$" and insert -- $\theta_1 = a_2^T x_{s0}$ -- therefor;

Column 10, Line 47, please delete "$\alpha_2^T$" and insert -- $a_2^T$ -- therefor;

Column 10, Line 62, please delete "$\dot{\theta}_0^d$" and insert -- $\dot{\theta}_0^d$ -- therefor;

Column 10, Line 63, please delete "$(\alpha_1^T - e_1^T)x_{s0} = \dot{\theta}_0^d T$" and insert -- $(a_1^T - e_1^T)x_{s0} = \dot{\theta}_0^d T$ -- therefor;

Column 10, Line 65, please delete "$\alpha_1^T$" and insert -- $a_1^T$ -- therefor;

CERTIFICATE OF CORRECTION (continued)
U.S. Pat. No. 9,156,159 B2

Column 10, Line 65, please delete " $e_1^T = [1 \quad 0_{1 \times 7}]$ " and insert -- $e_1^T = [1 \quad \mathbf{0}_{1 \times 7}]$ -- therefor;

Column 12, Line 4, please delete

" $\alpha_{12}^T \dot{\theta}_{c0} = \dot{\theta}_0^d T = (\alpha_{11}^T - [1 \quad 0_{1 \times 3}]) \theta_{c0}$ " and insert -- $a_{12}^T \dot{\theta}_{c0} = \dot{\theta}_0^d T - (a_{11}^T - [1 \quad \mathbf{0}_{1 \times 3}]) \theta_{c0}$ -- therefor.